June 21, 1938.  I. S. SALNIKOV  2,120,991
PRESSURE GAUGE
Filed June 29, 1935   3 Sheets-Sheet 3

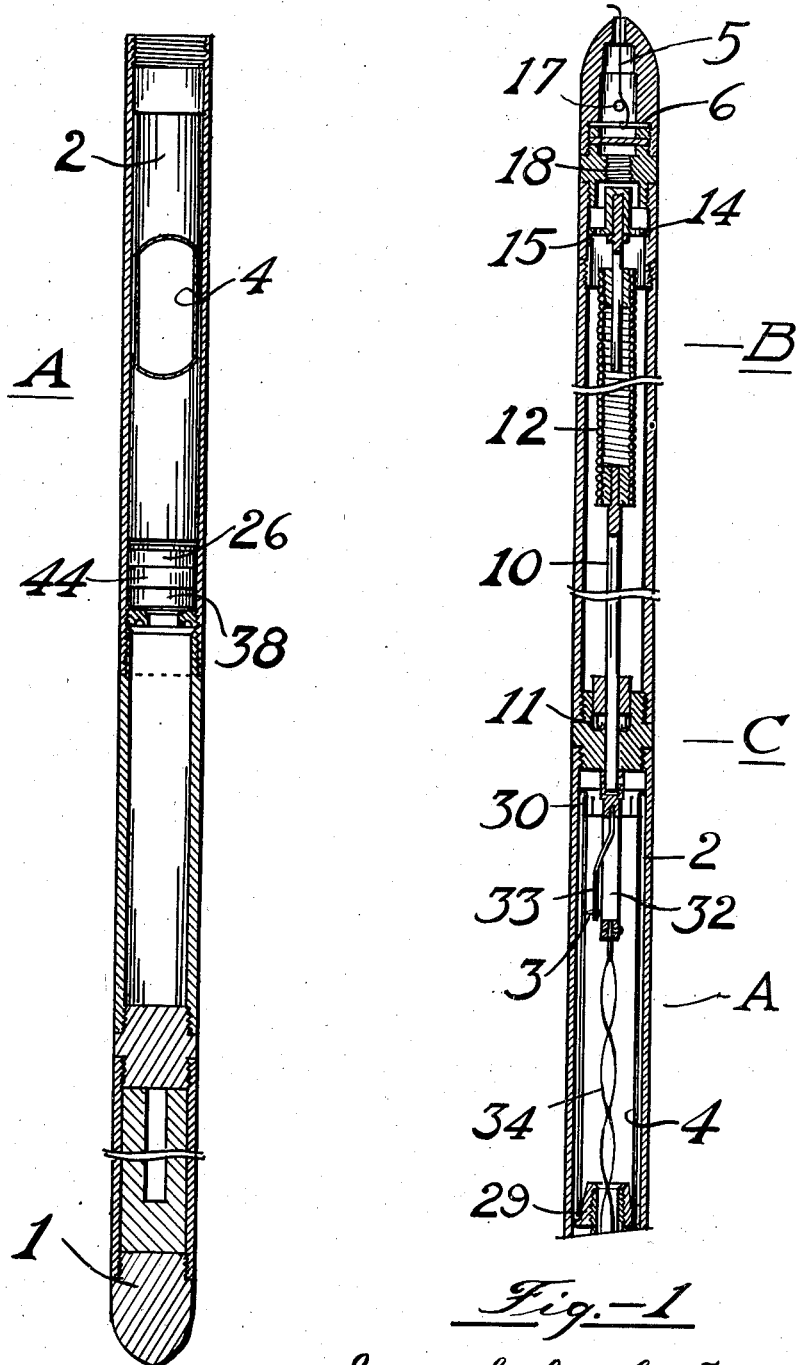

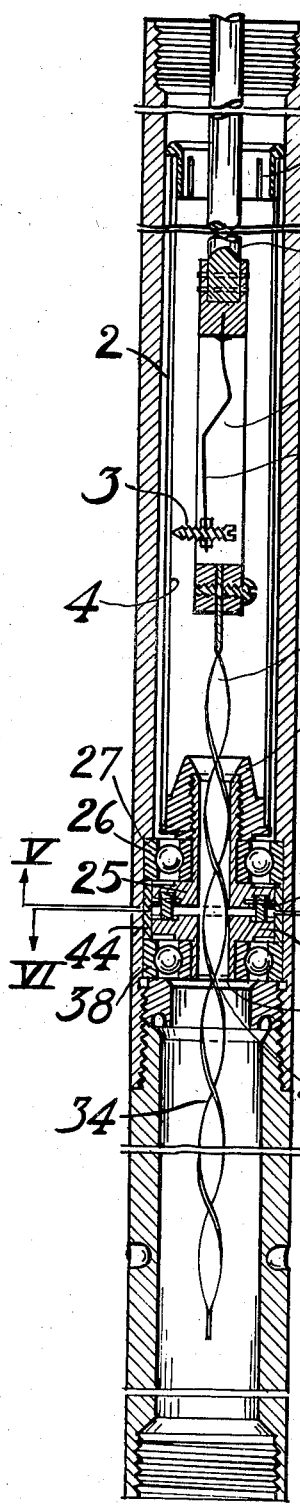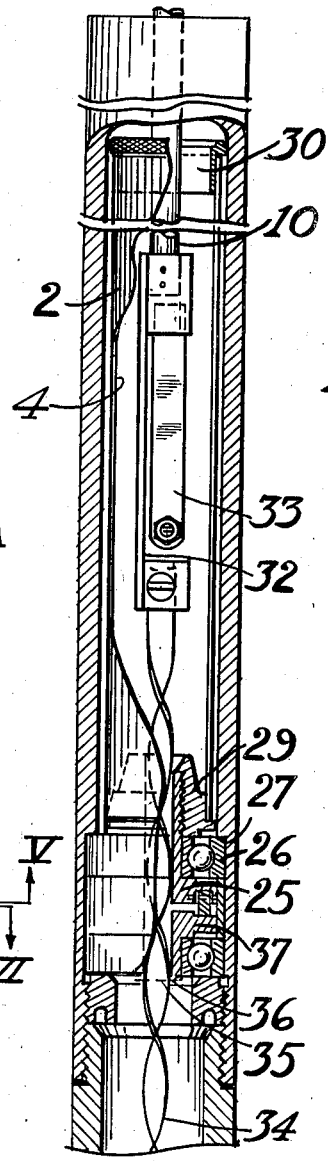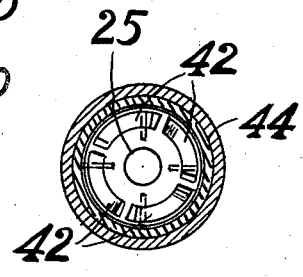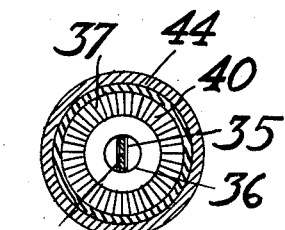

Ivan Salnikov Inventor
By P. L. Young Attorney

Patented June 21, 1938

2,120,991

UNITED STATES PATENT OFFICE 2,120,991

PRESSURE GAUGE

Ivan S. Salnikov, Seminole, Okla., assignor to Standard Oil Development Company, a corporation of Delaware Application June 29, 1935, Serial No. 29,097

18 Claims. (Cl. 73—300)

This invention relates to improvements in a pressure gauge, and more particularly to improvements in the mechanism for rotating the chart of a subsurface pressure gauge.

It is an object of this invention to provide a turning mechanism operative by the pressure normally exerted on the gauge to turn the recording chart drum and when used in measuring subsurface pressures to obtain a number of pressure readings at the same location or at various locations in the well in one run covering the range from well head pressure to bottom hole pressure.

Other objects will be apparent from the specification and from the accompanying drawings in which latter, Fig. 1 is a longitudinal sectional view through the pressure application end of a subsurface pressure gauge and embracing the chamber opening to the atmosphere;

Fig. 2 is a longitudinal sectional view through the portion of the gauge constituting the closed chamber and containing the recording drum;

Fig. 3 is a detail longitudinal sectional view showing the apparatus for turning the recording chart drum;

Fig. 4 is a longitudinal sectional view taken at right angles to the showing of Fig. 3;

Fig. 5 is a transverse sectional view looking along the line V—V of Fig. 3;

Fig. 6 is a transverse sectional view looking along the line VI—VI of Fig. 3;

Figure 7:
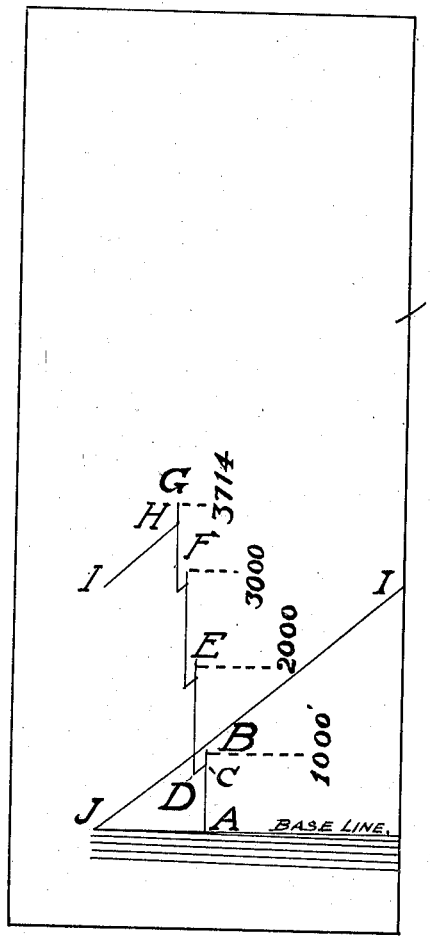
Fig. 7 shows a chart made by taking a series of pressure readings between the top and bottom of a well.

Referring to the drawings, a casing for a well pressure gauge is shown comprising a section A which constitutes a closed recording chamber, and a section B which constitutes a spring containing chamber opening to the atmosphere. Sections A and B are united at their adjoining ends by means of a wall or plug C which has screw threaded engagement with the sections. The recording chamber is closed at opposite ends by means of a nose piece 1 and the plug C whereby the contents of the recording chamber are maintained at any desired pressure, such as atmospheric pressure. The recording section contains a cylindrical recording drum 2 which is mounted for rotation within the casing and is driven by suitable mechanism to be later described. Marking means including a stylus 3 engages recording paper 4 disposed upon the inner surface of the cylindrical drum 2 and records the difference in pressure between the interior of the chamber B and the interior of the recording chamber A. The stylus is suitably supported by a mechanism, to be later described, for movement parallel with the longitudinal axis of the casing to record variations in the relative pressures of the fluid contents of the chambers. The pressure gauge is particularly adapted for use in a vertical position such as in an oil well, or the like, and is suspended by means of a cord 5 and fastening pin 6.

The position of the stylus is recorded by means of a line formed by the stylus upon the recording paper and extending at right angles to the longitudinal axis of the recording drum. The recording drum is driven in rotation a fraction of a revolution by the pressure of the medium surrounding the pressure gauge whereby the stylus draws a short line upon the paper and the distance between this line and a base line drawn on the chart when the pressure in the spring containing chamber is atmospheric is a measure of the pressure at the time the recording drum is rotated.

The stylus is moved in the casing parallel with the longitudinal axis of the casing to record the difference in pressure between the spring containing chamber B and the recording chamber A. The stylus is supported by a piston assembly including a shaft or piston 10 which extends slidably through a packing gland 11 in the plug C into the open chamber B of the casing. The packing gland 11 permits free longitudinal reciprocating movement of the piston 10 while preventing fluid communication between the chambers. The piston 10 is suspended by one end of a helical spring 12, the opposite end of which is in turn supported in fixed position by means of a washer 14. The washer 14 rests on a shoulder 15 which protrudes into the inner surface of the open chamber. The interior of the open chamber communicates with the atmosphere through an opening 17 in the side walls of the casing. The pressure to be measured is transmitted into the open chamber through the opening 17 and through an opening 18 into position to bear against the piston 10. The open chamber constitutes means for utilizing variations in pressure exteriorly of the casing to effect longitudinal movement of the piston in a given direction. The pressure upon the piston 10 tends to force the piston out of the chamber through the packing gland 11 until the tension in the spring 12 balances the forces tending to push the piston out. The distance which the piston has traveled is a measure of the difference in pressure within the open chamber B and the closed or recording chamber A. Before running the instrument in a well, the open chamber is filled with liquid, such as clean lubricating oil, whereby the possibility of the entrance of dirt, grit and the like into the open chamber is reduced.

The recording drum 2 is supported for rotary movement by means of a ratchet member 25. The ratchet member 25 is supported for rotary movement by means of a ball bearing 26 which rests against a shoulder 27 in the inner wall of the casing. The ratchet 25 rigidly supports as by screw threads a collar 29 which in turn is secured to the drum 2 as, for example, by a force fit. The cylindrical chart 4 is disposed within the drum 2 and is secured in place by means of a ferrule 30 secured to the free end of the drum 2. The stylus 3 for making a record upon the chart is secured in position within a slot 32 in the shaft 10 by means of a stylus spring 33.

The free end of the shaft 10 carries a spiral turning screw 34 which passes through a slot 35 in an end wall 36 of a tubular ratchet member 37 so as to have driving connection with the ratchet to effect rotation of the ratchet member 37 upon longitudinal movement of the unit comprising shaft 10 and screw 34. Rotary movement of the ratchet member 37 is facilitated by ball bearings 38 interposed between the tubular portion of the ratchet 37 and the wall of the casing. The head of the ratchet member 37 is provided with ratchet teeth designated 40 which cooperate with dogs 42 pivotally protruding from the head of ratchet member 25. The ratchet spacer 44 surrounds the ratchet heads between the ball bearings 26 and 38. Upon longitudinal movement of the shaft 10 from the pressure chamber B into the recording chamber A, the teeth 40 slip freely over the dogs 42. Upon reverse movement of the shaft 10, that is from recording chamber A to pressure chamber B, the teeth 40 are engaged by the dogs 42 whereby rotation of the recording drum 2 is effected. When pressure is exerted on the gauge in the well and the turning screw 34 is moved longitudinally together with the plunger or shaft 10, the ratchet member 37 is turned by the screw 34 without turning the chart drum 2. In this movement, the dogs 42 of the ratchet simply slide over the teeth of the ratchet member 37. On the other hand, when the pressure is decreased either by natural cause or by raising the gauge to a higher level in the well, the piston 10 and the screw 34 due to the reduction in the pressure move in the opposite direction. In this latter movement, the screw 34 turns the ratchet member 25 in the opposite direction. The chart drum 2 is turned in rotary movement, thus leaving a record of the pressure at this particular location in the well.

Any change from a higher to a lower pressure will produce a record of the high pressure. Inasmuch as the pressure in the well is of varying intensity, being lower at the top and higher at the bottom, the lifting of the gauge from a lower level to a higher one will produce a reduction in pressure. Therefore, with this mechanism the raising of the gauge in the well will turn the chart drum 2 and the record of the pressure at any point can be secured any desired number of times with ease.

Referring to Fig. 7, a type of chart is illustrated, made by taking a series of pressure readings between the top and bottom of a well. The gauge was lowered to the 1000 foot level making the line A—B. Then the gauge was raised in the well to cause a decrease in pressure and turn the chart drum which resulted in the line A—B being retraced to the point C, when the dogs of the ratchet engaged and turned the chart drum 2, making the line C—D. Then the gauge was lowered to the 2000 foot level making the line D—E. By repeating the above procedure points F and G were made. The distance of the points B, E, F and G from the base line is a measure of the plunger displacement at the various depths, and by means of a calibration chart these plunger displacements may be converted into pressure.

Figure 8:
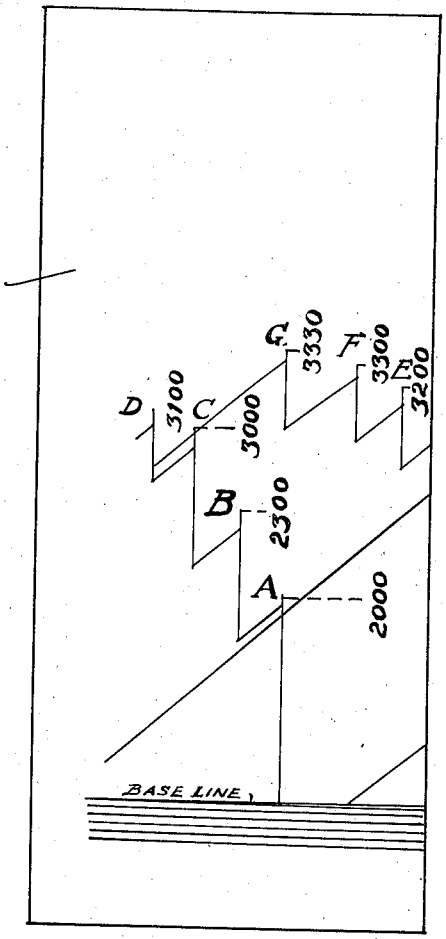
Fig. 8 shows a chart made in the same manner as Fig. 7, but showing how the points may follow around the chart instead of being in succession as in Fig. 6.

Referring to Fig. 8, a chart is shown made in the same manner as that shown in Fig. 7, but showing how the points may follow around instead of being in succession as in Fig. 7. The points were made in the order lettered.

By the construction described, a subsurface pressure gauge is provided which is extremely simple in construction, is positive in action, functions to record pressures independently of time, is sturdy and sufficiently rugged for heavy usage and can be used for producing an unlimited number of readings.

Various changes may be made within the scope of the appended claims in which it is desired to claim all novelty inherent in the invention as broadly as the prior art permits.

I claim:

1. A gauge device, comprising a casing, a recording drum mounted for rotation within the casing, a piston mounted for movement longitudinally through a wall of the casing, a resisting force acting on the piston proportional to variations in pressure externally of the casing whereby the piston is reciprocated due to variations in pressure applied to the assembly externally of the casing, an annular ratchet member mounted for rotation within the casing, a turning screw carried by the piston and operatively engaging the ratchet member whereby the ratchet member is turned upon variation in longitudinal position of the assembly, and a pawl carried by the recording drum in engagement with the ratchet member whereby rotation of the ratchet member in one direction effects rotation of the recording drum.

2. A gauge device, comprising a closed recording chamber, a rotary recording drum disposed in the chamber, a piston extending slidably through a wall of the chamber in fluid-tight relation with respect to the wall into the closed chamber, spring means exteriorly of the chamber operatively associated with the piston for yieldingly resisting movement of the piston proportional to the variations in pressure whereby variation in fluid pressure exteriorly of the chamber alters the position of the piston, and means for transforming the movement of the piston in a given direction into rotary movement of the recording drum.

3. A gauge device, comprising a closed recording chamber, a rotary recording drum disposed in the chamber, a piston extending slidably through a wall of the chamber in fluid-tight relation with respect to the wall into the closed chamber, spring means operatively associated with the piston for yieldingly resisting movement of the piston proportional to the variations in pressure whereby variation in fluid pressure exteriorly of the chamber alters the longitudinal position of the piston, a turning screw carried by the piston, and a ratchet operatively associated with the turning screw and the recording drum whereby change of position of the piston in a given direction effects rotation of the drum.

4. A gauge device, comprising a closed recording chamber, a rotary recording drum disposed in the chamber, a piston extending slidably through a wall of the chamber in fluid-tight relation with respect to the wall into the closed chamber, spring means operatively associated with the piston for yieldingly resisting movement of the piston proportional to variations in pressure whereby variation in fluid pressure exteriorly of the chamber alters the longitudinal position of the piston, a stylus carried by the piston in engagement with the recording drum, a turning screw carried by the piston, and a ratchet operatively associated with the turning screw and the recording drum whereby change in position of the piston in a given direction effects rotation of the drum and a lateral mark on the drum by the stylus.

5. A gauge device, comprising a closed recording chamber, a recording drum disposed in the closed chamber, a piston extending slidably through a wall of the chamber in fluid-tight relation with respect to the wall into the closed chamber, spring means operatively associated with the piston whereby variation in fluid pressure exteriorly of the chamber alters the longitudinal position of the piston, a turning screw carried by the piston, a ratchet member driven by the turning screw, and a pawl carried by the recording drum and engaging the ratchet member whereby movement of the piston in one direction effects rotation of the recording drum.

6. A gauge device, comprising a closed recording chamber, a recording drum disposed in the closed chamber, a piston extending slidably through a wall of the chamber in fluid-tight relation with respect to the wall, spring means operatively associated with the piston whereby variation in fluid pressure exteriorly of the chamber alters the longitudinal position of the piston, a turning screw carried by the piston, a ratchet member driven by the turning screw, and a pawl carried by the recording drum and engaging the ratchet member operatively to clutch the ratchet member only when the piston is moved out of the closed chamber whereby the drum is rotated.

7. A gauge device, comprising a closed recording chamber, a recording drum disposed in the chamber, a piston extending slidably through a wall of the chamber in fluid-tight relation with respect to the wall, spring means operatively associated with the piston whereby variation in fluid pressure exteriorly of the chamber alters the position of the piston, a stylus carried by the piston in engagement with the recording drum adapted to make a mark extending along the longitudinal axis of the drum, a turning screw carried by the piston, a ratchet member driven by the turning screw, and a pawl carried by the recording drum and engaging the ratchet member to clutch the ratchet only when the piston is moved out of the closed chamber whereby the drum is rotated and a lateral mark is made on the drum.

8. A gauge device, comprising a casing having a closed chamber and a chamber opening to the atmosphere, a wall separating the chambers, record receiving means disposed in the closed chamber, a piston extending slidably from the open chamber through the wall in fluid-tight relation to the wall and carrying a stylus in engagement with the record receiving means, spring means in the open chamber suspending the piston whereby variation in fluid pressure within the open chamber alters the longitudinal position of the piston with respect to the record receiving means, clutch means operatively associated with the record receiving means and the piston, and means associated with the piston for actuating the clutch means on movement of the piston in one direction to effect rotary movement of the record receiving means.

9. A gauge device, comprising a casing having a closed chamber and a chamber opening to the atmosphere, a wall separating the chambers, a rotary recording drum disposed in the closed chamber, a piston extending slidably from the open chamber through the wall in fluid-tight relation with respect to the wall into the closed chamber, spring means in the open chamber suspending the piston whereby variation in fluid pressure within the open chamber alters the position of the piston, and means for transforming the movement of the piston in a given direction into rotary movement of the recording drum.

10. A gauge device, comprising a casing having a closed chamber and a chamber opening to the atmosphere, a wall separating the chambers, a rotary recording drum disposed in the closed chamber, a piston extending slidably from the open chamber through the wall in fluid-tight relation with respect to the wall into the closed chamber, spring means in the open chamber operatively associated with the piston whereby variation in fluid pressure within the open chamber alters the longitudinal position of the piston, a turning screw carried by the piston, and a ratchet member operatively associated with the turning screw and the recording drum whereby change of longitudinal position of the piston in a given direction effects rotation of the drum.

11. A gauge device, comprising a casing having a closed chamber and a chamber opening to the atmosphere, a wall separating the chambers, a rotary recording drum disposed in the closed chamber, a piston extending slidably from the open chamber through the wall in fluid-tight relation with respect to the wall into the closed chamber, spring means in the open chamber operatively associated with the piston whereby variation in fluid pressure within the open chamber alters the longitudinal position of the piston, a stylus carried by the piston in engagement with the recording drum, a turning screw carried by the piston, and a ratchet member operatively associated with the turning screw and the recording drum whereby change of longitudinal position of the piston in a given direction effects rotation of the drum and a lateral mark on the drum by the stylus.

12. A gauge device, comprising a casing having a closed chamber and a chamber opening to the atmosphere, a wall separating the chambers, a recording drum disposed in the closed chamber, a piston extending slidably from the open chamber through the wall in fluid-tight relation with respect to the wall into the closed chamber, spring means in the open chamber suspending the piston whereby variation in fluid pressure within the open chamber alters the position of the piston, a turning screw carried by the piston in the closed chamber, a ratchet member driven by the turning screw, and a pawl carried by the recording drum and engaging the ratchet member whereby longitudinal movement of the piston in one direction effects rotation of the recording drum.

13. A gauge device, comprising a casing having a closed chamber and a chamber opening to the atmosphere, a wall separating the chambers, a recording drum disposed in the closed chamber, a piston extending slidably from the open chamber through the wall in fluid-tight relation with respect to the wall into the closed chamber, spring means in the open chamber suspending the piston whereby variation in fluid pressure within the open chamber alters the position of the piston, a turning screw carried by the piston in the closed chamber, a ratchet member driven by the turning screw, and a pawl carried by the recording drum and engaging the ratchet member to clutch the ratchet member only when the piston is moved out of the closed chamber whereby the drum is rotated.

14. A gauge device, comprising a casing having a closed chamber and a chamber opening to the atmosphere, a wall separating the chambers, a recording drum suspended in the closed chamber, a piston extending slidably from the open chamber through the wall in fluid-tight relation with respect to the wall into the closed chamber, spring means in the open chamber suspending the piston whereby variation in fluid pressure within the open chamber alters the position of the piston, a stylus carried by the piston in engagement with the recording drum adapted to make a mark extending along the longitudinal axis of the drum, a turning screw carried by the piston in the closed chamber, a ratchet member driven by the turning screw, and a pawl carried by the recording drum and engaging the ratchet member to clutch the ratchet member only when the piston is moved out of the closed chamber whereby the drum is rotated and a lateral mark is made on the drum.

15. A gauge device, comprising a casing, a recording drum mounted for rotation within the casing, a piston protruding from the casing and operative to be moved longitudinally into the casing in response to increase in pressure exteriorly of the casing, a resisting force acting on the piston proportional to the variation in pressure, and means connected to the piston and to the drum to translate longitudinal movement of the piston in a given direction into rotary movement of the drum.

16. A gauge device, comprising a closed casing, a piston mounted for reciprocation longitudinally through a wall of the casing, means for utilizing variations in pressure exteriorly of the casing to effect longitudinal movement of the piston in a given direction, means for yieldingly resisting the movement proportional to the variations in pressure, a recording drum mounted for rotation within the casing, a ratchet operatively associated with the recording drum, and means for causing the reciprocation of the piston in one direction to effect rotation of the ratchet whereby the drum is rotated.

17. A gauge device, comprising a closed recording chamber, a recording drum mounted for rotation within the chamber, a piston extending through the wall of the chamber in fluid-tight relation to the wall and into the chamber, a resisting force acting on the piston proportional to variations in pressure externally of the chamber, whereby variations in fluid pressure exteriorly of the chamber effect longitudinal movement of the piston, a spiral turning screw carried by the piston within the chamber, and a driving connection between the screw and the drum whereby longitudinal movement of the turning screw in a given direction effects rotation of the drum.

18. A gauge device, comprising a closed recording chamber, recording receiving means disposed in the chamber, marking means including a piston responsive to variations in pressure exteriorly of the chamber extending slidably through a wall of the chamber in fluid-tight relation to the wall into engagement with the record receiving means, the piston carrying a stylus, spring means for yieldingly resisting movement of the piston proportional to the variations in pressure, and means operatively associated with the record receiving means and the marking means whereby longitudinal movement of the marking means in one direction effects rotary movement of the record receiving means.

IVAN S. SALNIKOV.